June 2, 1942.  S. C. WATSON  2,284,934
SHAFT COUPLING
Filed Dec. 30, 1939  2 Sheets-Sheet 1

Inventor.
Sydney C. Watson.
by Parker & Carter
Attorneys.

June 2, 1942.  S. C. WATSON  2,284,934
SHAFT COUPLING
Filed Dec. 30, 1939  2 Sheets-Sheet 2

Inventor.
Sydney C. Watson.
by Parker + Carter.
Attorneys.

Patented June 2, 1942

2,284,934

UNITED STATES PATENT OFFICE 2,284,934

SHAFT COUPLING

Sydney C. Watson Chicago, Ill., assignor to Tor-Vel Associates, having as trustees Sydney C. Watson and Alvin J. Parcelle Application December 30, 1939, Serial No. 311,796

3 Claims. (Cl. 74—189.5)

This invention relates to a shaft coupling and may be used in almost any association in which it is desired to connect two shafts together.

In the particular form shown, the shafts have a common axis and power is transmitted from one to the other. One object of the invention is to provide a shaft coupling for a driving and a driven shaft so arranged that the two shafts may move at the same speed and torque or at different speeds and different torques and in which the two shafts are driven or caused to rotate in the same direction, irrespective of any variation between them in speed or torque.

Other objects will appear from time to time in the specification and claims.

The invention is illustrated more or less diagrammatically in the accompanying drawings, wherein.

Like parts are designated by like characters throughout the specification and the drawings.

Figure 1:
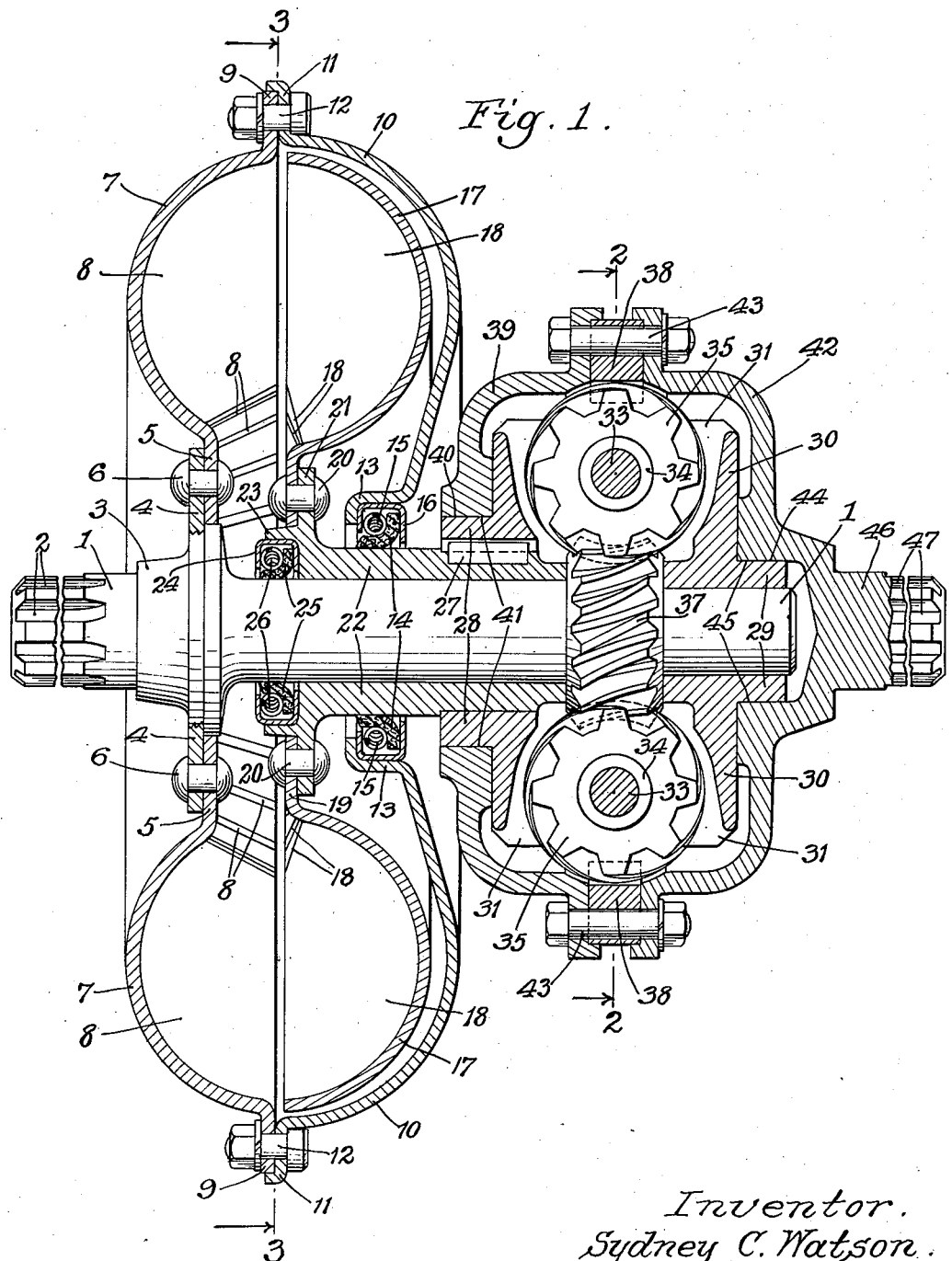
Figure 1 is a longitudinal section through the coupling with parts in elevation and parts broken away.
Figure 2:
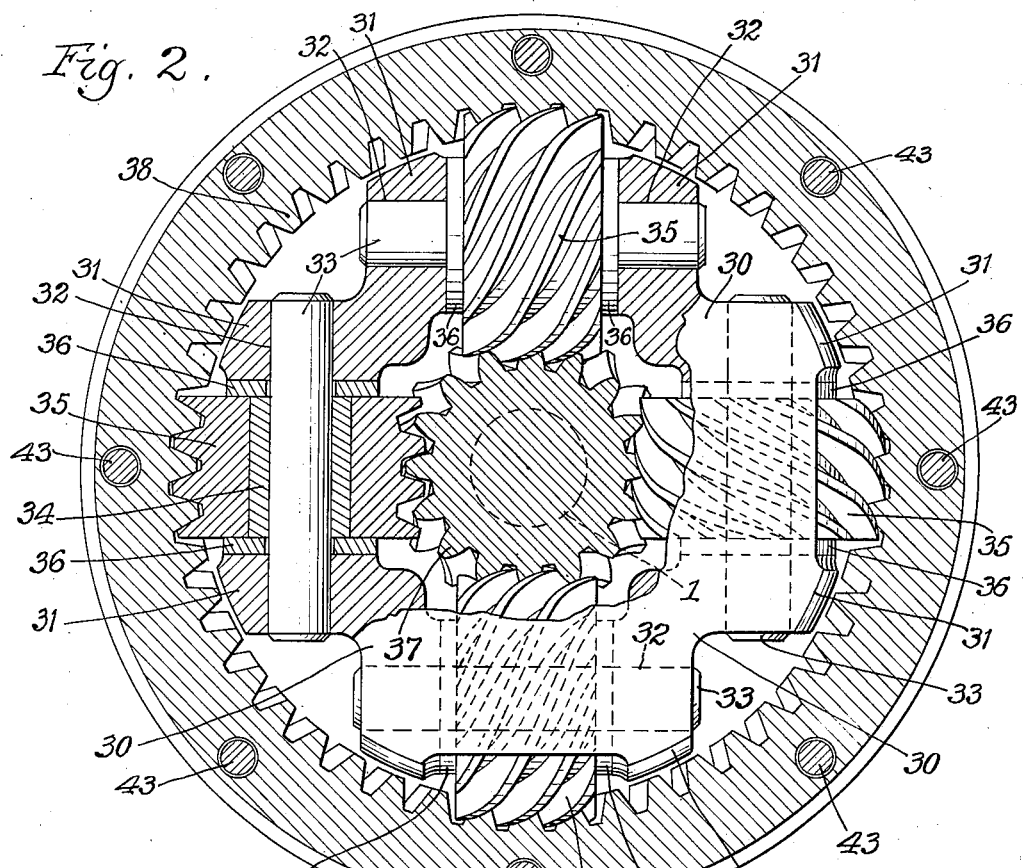
Figure 2 is a transverse vertical section taken at line 2—2 of Figure 1 on an enlarged scale.
Figure 3:
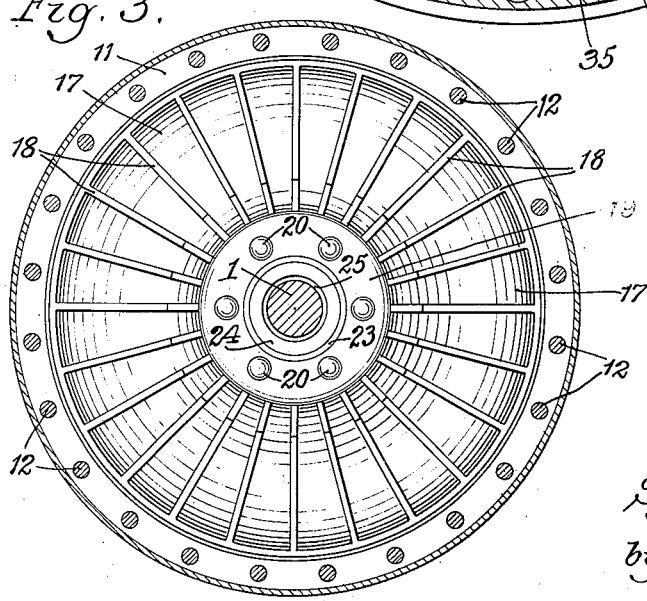
Figure 3 is a transverse vertical section taken at line 3—3 of Figure 1 on a reduced scale.

1 is a shaft which, for the purposes of the present explanation, may be considered as the driving shaft and may be driven from any suitable source of power. It is preferably splined as at 2 for ready connection to whatever driving means or connection may be used. Fixed on the shaft 1 or made integrally with it, if desired, is a hub 3 which has a laterally extending flange 4 secured to or formed as a part of it. 5 is a flangelike central portion of an impeller which is secured by rivets 6 to the flange 4. The outer portion of the impeller is approximately semi-arcuate in cross section as at 7. Mounted in this portion of the impeller are a plurality of radially arranged impeller blades 8. At its outer edge, the impeller may be provided with a flat flangelike portion 9. 10 is a housing member having an outer flange portion 11 which is secured by bolts 12 to the flange 9 of the impeller. The housing 10 is relatively arcuate through a portion of its shape as shown particularly in Figure 1 and terminates on its inner edge in a retaining portion 13 which serves to retain a packing member 14, a spring 15 and a packing housing 16. Mounted within the housing portion 10 is a runner 17 which is provided with a series of preferably radially arranged blades 18. At its inner edge the runner has a flat flangelike portion 19 which, by means of rivets 20, is secured to a corresponding flange 21 on a hollow shaft or sleevelike portion 22. At its one end, this sleevelike portion has an outwardly extending annular flange 23 within which a packing housing 24 is mounted. Within this housing is positioned a packing 25 and a spring 26.

It is to be understood that the packings and packing housing described may be of any desirable type and the invention is not limited to the particular forms shown. Any packing which prevents undue leakage of the material from within the impeller and runner cavity may be satisfactory and is within the contemplation of my invention.

The sleevelike member 22 is secured, for example, by a member 27 to a gear retainer or carrier which includes a pair of sleevelike portions 28 and 29, the portion 28 being fastened to the member 22 and the portion 29 bearing upon the shaft 1. The gear retainer or carrier also includes four weblike portions 30. Each of these weblike portions 30 is joined by or made integral with a pair of extensions 31, each of which is perforated as at 32 to receive a shaft 33. Upon each of the shafts 33 may be mounted a bushing 34, if desired, upon which is positioned a worm or helical gear 35. These gears have a plurality of threads or gear teeth which comprise screw threads or helixes described about the axis of said gears. The gears are shown as without anti-friction bearings but any sort of anti-friction bearing may be used, if desired. Members 36 may also be positioned one on each side of each gear, if desired, although they are not always essential and the invention is not limited to their use.

Fixed on the shaft 1 is a gear 37 which meshes with each of the gears 35 and has a plurality of teeth cut on a helix or thread described about its own axis.

Surrounding the gears and the gear retainer thus described is an internal gear 38 which meshes with the gears 35. In the form here shown, it has teeth cut in a helix described about its own axis. The gear 38 is fastened to a shell 39 which, on its inner edge as at 40, bears against a shoulder 41 formed on the gear retainer or carrier. Upon its other side, the gear 38 is secured to a second shell portion 42. Bolts 43 secure the gear 38 to the shell portions 39 and 42. Toward its inner surface, the shell portion 42 is provided with a bearing surface 44 which bears upon a corresponding surface 45 formed on the gear retainer. The shell section 42 terminates in an outwardly extending shaft-like portion 46 which may be splined or otherwise shaped as at 47 for ready attachment to a part which is to be driven.

Although there is shown an operative form of the device, it will be understood that many changes in the form, shape and arrangement of parts might be made without departing from the spirit of this invention, and it is wished that the showing be taken as, in a sense, diagrammatic.

The use and operation of this device are as follows:

If power is applied to the shaft 1, the impeller is driven and it hydraulically drives the runner which is secured to the idler gear carrier. The shaft 1 also carries the gear 37 which meshes with the idler gears. Under some conditions no rotation of these gears will occur and by axial thrust they drive the gear 38, the member 42 and the shaft 46. However, under certain conditions, slip between the impeller and the runner may occur and the mechanism here shown constitutes, among other things, a means for inserting a train of gears in the slip between the impeller or driving member and the runner or driven member of a fluid or hydraulic coupling in which the reaction member of the gear train is rigidly connected to the driven member of the fluid coupling. The driving gear of the gear train is rigidly connected to the driving member of the fluid coupling and there is, thus, a definite and calculable ratio of rotatable speed reduction between the driving and driven members of the train of gears for any degree of slip between the driving and driven members of the fluid coupling.

Under many conditions no slip occurs, and the entire device rotates as a unit. Under other conditions slip to varying degrees will occur; and when this slip occurs between the impeller and the runner of the hydraulic coupling, the geared reduction means becomes effective and is, in effect, interposed between the driving and the driven members.

I claim:

1. In combination, an internal worm gear drive and fluid coupling therefor, a drive shaft, an impeller fixed on said shaft, a sleeve rotatable about said shaft, a runner fixed on said sleeve and opposed to said impeller, a driven shaft, a gear housing fixed in relation to said driven shaft and surrounding the end of said drive shaft and the end of said sleeve adjacent said driven shaft, an internal worm gear fixed in relation to said gear housing, a carrier fixed to said sleeve within said gear housing and surrounding said drive shaft, a plurality of worms positioned for rotation in said carrier and in mesh with said internal worm gear, and an external worm gear fixed on said drive shaft and in mesh with said worms, whereby, when the load on said driven shaft does not exceed the turning effort on said runner, said external worm gear drives said driven shaft directly, in the same direction as the driving shaft, through said worms, internal worm gear and gear housing, and when the load on the driven shaft exceeds said turning effort, a reduced drive is effected.

2. In combination, an internal worm gear drive and fluid coupling therefor, a drive shaft, an impeller fixed on said shaft, a sleeve rotatable about said shaft, a runner fixed on said sleeve and opposed to said impeller, a driven shaft, a gear housing fixed in relation to said driven shaft and surrounding the end of said drive shaft and the end of said sleeve adjacent said driven shaft, an internal worm gear fixed in relation to said gear housing, a carrier fixed to said sleeve within said gear housing and surrounding said drive shaft, a plurality of worms positioned for rotation in said carrier and in mesh with said internal worm gear, and an external worm gear fixed on said drive shaft and in mesh with said worms, whereby, when the load on said driven shaft does not exceed the turning effort on said runner, said external worm gear drives said driven shaft directly, in the same direction as the driving shaft, through said worms, internal worm gear and gear housing, and when the load on the driven shaft exceeds said turning effort, a reduced drive is effected, said gear housing provided with a cavity within which both said drive shaft and said carrier are supported for rotation.

3. In combination, an internal worm gear drive and fluid coupling therefor, a drive shaft, an impeller fixed on said shaft, a sleeve rotatable about said shaft, a runner fixed on said sleeve and opposed to said impeller, a driven shaft, a gear housing fixed in relation to said driven shaft and surrounding the end of said drive shaft and the end of said sleeve adjacent said driven shaft, an internal worm gear fixed in relation to said gear housing, a carrier fixed to said sleeve within said gear housing and surrounding said drive shaft, a plurality of worms positioned for rotation in said carrier and in mesh with said internal worm gear, and an external worm gear fixed on said drive shaft and in mesh with said worms, whereby, when the load on said driven shaft does not exceed the turning effort on said runner, said external worm gear drives said driven shaft directly, in the same direction as the driving shaft, through said worms, internal worm gear and gear housing, and when the load on the driven shaft exceeds said turning effort, a reduced drive is effected, and sealing means for said fluid coupling, including a second housing element fixed to said impeller and enclosing said runner, and a sealing connection between said second housing and the exterior of said sleeve and a second sealing connection between said sleeve and said driving shaft.

SYDNEY C. WATSON.